No. 885,181. PATENTED APR. 21, 1908.
J. H. SAGER.
AUTOMOBILE BUFFER.
APPLICATION FILED FEB. 21, 1908.

WITNESSES:
Clarence W. Carroll
L. Thow.

INVENTOR:
James H. Sager
by Odyard Davis
his Attys

UNITED STATES PATENT OFFICE.

JAMES H. SAGER, OF ROCHESTER, NEW YORK.

AUTOMOBILE-BUFFER.

No. 885,181.　　　Specification of Letters Patent.　　Patented April 21, 1908.

Application filed February 21, 1908. Serial No. 417,190.

*To all whom it may concern:*

Be it known that I, JAMES H. SAGER, a citizen of the United States, and resident of Rochester, in the county of Monroe and State of New York, have invented certain new and useful Improvements in Automobile-Buffers, of which the following is a specification.

This invention relates to automobile buffers, and consists in the apparatus hereinafter described and claimed.

The object of the invention is to provide an automobile buffer that is easily applied to automobiles without change of their construction, and is simple and efficient.

Figure 1:
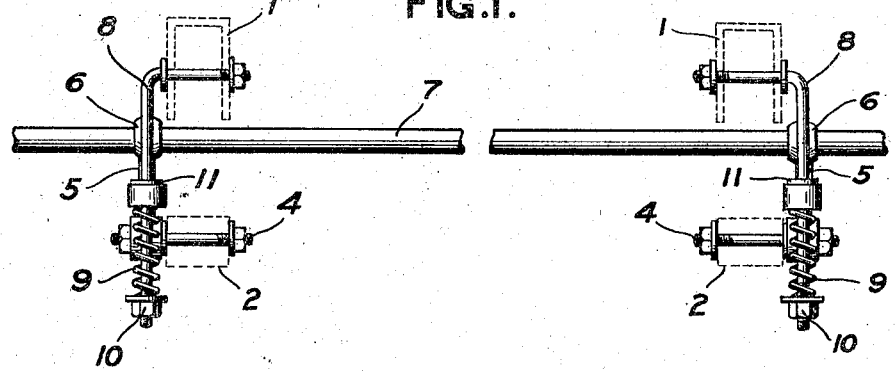
Figure 2:
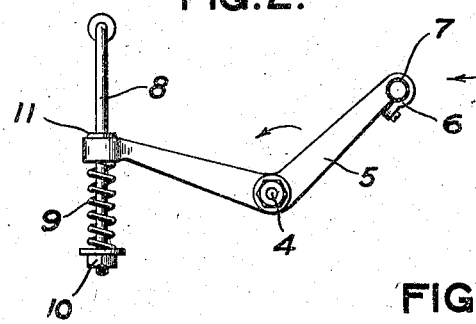
Figure 3:
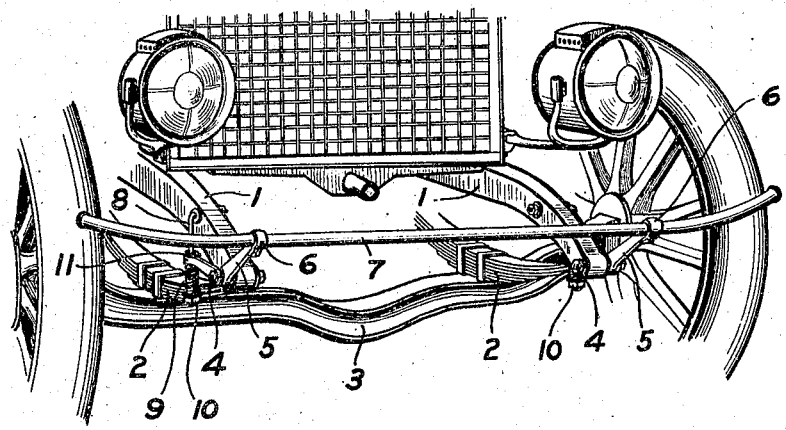

In the drawings:—Figure 1 is a rear elevation of a device embodying my invention, showing in dotted lines the automobile parts to which it is attached; Fig. 2 is a side elevation of one of the levers thereof and its connected parts; and Fig. 3 is a perspective view of a portion of the front of the automobile, showing this invention in place thereon.

In the drawings, 1, 1, are the side frame bars of an automobile; 2, 2, are the semi-elliptic springs having their front ends attached to the ends of said frame bars 1, 1, and attached as usual to the axle 3. The same bolt 4, whereby the frame bar 1 is attached to the spring 2, is used also as the pivot for an elbow lever 5. Since there are two frame bars and springs, there will be two levers 5. One arm of each lever projects forward from the spring and frame bar, and has a contractible loop 6 at its end in which is fastened the buffer rod 7. This buffer rod extends across the front of the machine in a horizontal plane, and preferably extends over the front of the wheels of the automobile. A spring actuates the lever and has a spring support arranged in convenient proximity to the lever. The rearward arm of the lever 5 passes around a support consisting of a rod or bar 8, that is fastened in any suitable manner to a stationary part of the automobile, such as the frame bar 1. The bar 8 and lever thus are stayed and guided. In the construction shown, the bar 8 is bent into an L-shape, and the horizontal portion thereof passes through and is fastened to the frame bar 1, and the remainder of the bar hangs downward vertically from its supporting arm and, as stated, passes freely through the rear arm of the lever 5. Around the bar 8 is a coiled spring 9, which bears against the under side of the rear arm of the lever 5, and also at its other end against a nut 10 that is fastened on the lower end of the bar 8. A stop 11 on the bar 8 prevents the rearward arm of the lever from rising too far and the spring 9 normally holds the lever against the stop. It will be noted, particularly from Fig. 2, that a shock upon the buffer rod 7, in the direction of the straight arrow at the right of Fig. 2, will cause the lever to swing around its pivot in the direction of the curved arrow in said figure. This depresses the rear end of said lever, and thus puts the spring 9 under tension as the lever moves around its pivot. In the present example of the invention, the buffer rod 7 rises when it strikes an impediment.

The bolt 4 is the pivotal axis of the lever and is in a substantially vertical plane, which is a plane at right angles to the plane on which the automobile moves.

What I claim is:—

1. In an automobile buffer, a horizontal buffer rod, lever means attached to said rod and pivoted to the frame of the automobile on an axis in a substantially vertical plane and projecting at an angle to said plane from the pivotal axis to the attachment thereof to said rod, a spring put under stress by movement of the lever around its pivot, and a spring support attached to said automobile and in convenient proximity to said lever.

2. In an automobile buffer, a horizontal buffer rod, a pair of levers attached to said rod and pivoted to the frame of the automobile on a horizontal axis and projecting at an angle to a horizontal plane from the pivotal axis to the attachment of said lever to said rod, a spring supporting bar and guide for each lever attached to the frame of the automobile, and a spring carried by each supporting bar and put under stress by movement of the lever around its pivot.

3. In an automobile buffer, a horizontal buffer rod, a pair of levers attached to said rod and pivoted to the frame of the automobile on a horizontal axis and projecting at an angle to a horizontal plane from the pivotal axis to the attachment of said lever to said rod, a spring supporting bar attached to the frame of the automobile, and a spring coiled around said bar and pressing at one end on said lever and at the other end on said bar.

4. In an automobile buffer, a horizontal buffer rod, a pair of elbow levers pivoted to the front extremity of the automobile frame and having front arms projecting upward from the pivotal axis at an angle to a horizontal plane and carrying said buffer rod on their front ends, a spring support attached to the frame of said automobile and in convenient proximity to said lever, and a spring on said support adapted to be put under stress by movement of the lever around its pivot.

5. In an automobile buffer, a horizontal buffer rod, a pair of elbow levers pivoted to the front extremity of the automobile frame and having front arms projecting upward from the pivotal axis at an angle to a horizontal plane and carrying said buffer rod on their front ends, a spring support attached to the frame of said automobile and passing through the rear arm of said lever, and a spring coiled around said support and pressing at one end on said lever and at the other end on said support.

6. In a automobile buffer, a horizontal buffer rod, lever means attached to said rod and pivoted to the frame of the automobile and connecting them in a line at an angle to the line of motion of the automobile from the pivotal axis to the point of attachment of said lever to said rod, and a spring put under stress by movement of the lever around its pivotal axis.

7. In an automobile buffer, a horizontal buffer rod, lever means attached to said rod and pivoted to the frame of the automobile and connecting them in a line at an angle to the line of motion of the automobile from the pivotal axis to the point of attachment of said lever to said rod, a spring put under stress by movement of the lever around its pivotal axis, and a support for said spring attached to said automobile and in convenient proximity to said lever.

8. In an automobile buffer, a horizontal buffer rod, lever means attached to said rod and pivoted to the frame of the automobile and connecting them in a line at an angle to the line of motion of the automobile from the pivotal axis to the point of attachment of said lever to said rod, a spring-supporting bar attached to the frame of the automobile, and a spring coiled around said bar and pressing at one end on said lever and at the other end on said bar.

JAMES H. SAGER.

Witnesses:
D. GURNEE,
L. THON.